United States Patent [19]

Hauser et al.

[11] Patent Number: 5,778,065
[45] Date of Patent: Jul. 7, 1998

[54] METHOD AND SYSTEM FOR CHANGING AN AUTHORIZATION PASSWORD OR KEY IN A DISTRIBUTED COMMUNICATION NETWORK

[75] Inventors: Ralf Hauser, Zurich; Philippe Janson, Waedenswil, both of Switzerland; Refik Molva, Valbonne, France; Gene Tsudik; Elsie Van Herreweghen, both of Thalwil, Switzerland

[73] Assignee: International Business Machines Corporation, Armonk, N.Y.

[21] Appl. No.: 598,481

[22] Filed: Feb. 8, 1996

[51] Int. Cl.⁶ ............................................. H04L 9/00
[52] U.S. Cl. ................................... 380/21; 380/25
[58] Field of Search ............................ 380/21, 25, 4

[56] References Cited

U.S. PATENT DOCUMENTS

| | | | |
|---|---|---|---|
| 5,148,479 | 9/1992 | Bird et al. | 380/25 |
| 5,224,163 | 6/1993 | Gasser et al. | 380/25 |
| 5,347,580 | 9/1994 | Molva et al. | 380/21 |
| 5,369,705 | 11/1994 | Bird et al. | 380/21 |
| 5,371,794 | 12/1994 | Diffie et al. | 380/21 |
| 5,418,854 | 5/1995 | Kaufman et al. | 380/21 |
| 5,491,750 | 2/1996 | Bellare et al. | 380/21 |
| 5,629,980 | 5/1997 | Stefik et al. | 380/4 |

Primary Examiner—Salvatore Cangialosi
Attorney, Agent, or Firm—Ronald L. Drumheller

[57] ABSTRACT

A robust and secure password (or key) change method between a user and an authentication server in a distributed communication network is disclosed. The protocol requires the exchange of only two messages between the user desiring the key change and the server, the user's request including, at least partly encrypted, an identification of the sending user, old and new keys, and two nonces, at least one including a time indication. The authentication server's response includes a possibly encrypted accept/reject indication and the regularly encrypted request from the user.

8 Claims, 3 Drawing Sheets

METHOD AND SYSTEM FOR CHANGING AN AUTHORIZATION PASSWORD OR KEY IN A DISTRIBUTED COMMUNICATION NETWORK

DESCRIPTION

1. Technical Field

In today's communication networks, authentication between users—here employed in a very broad sense, as detailed below—is usually performed by exchanging passwords or secrets enciphiered under cryptographic keys. Since such keys generally have, for security reasons, a limited lifetime, their change and exchange between the users concerned is of particular importance this invention provides a robust and secure method and system for changing such keys on-line over the network.

2. Description of the Prior Art

Many protocols for exchanging passwords or keys are known and much effort has been put into securinig initial log-ins over insecure communication network lines from partly-trusted user workstations. Generally, passwords or keys are necessary to communicate safely between users, or between users and servers for accessing application programs or other purposes, including confidentiality, integrity, and authentication. It should be noted that authentication is also necessary for servers, i.e. even servers need to prove their identity to prevent an intruder from masquerading as a server.

For two-party authentication, quite a number of specific protocols exist. These protocols usually assume that the two parties share a common secret key at some point in time, Similar protocols are known for distributed networks that include a kind of administrator station, highly secure and trusted, usually called authentication server. This authentication server processes the authentication requests from the parties desiring to communicate by acting as a trustworthy arbiter. To achieve that, the authentication server has access to the passwords or keys of all parties involved.

A well-known solution for network-wide log-in is part of the "Kerberos" system, originated at the Massachusetts Institute of Technology (MIT), and described in [1]. The Kerberos system includes a change-password protocol which avoids openly transmitting the new and old passwords over the communication line. This protocol is depicted in FIG. 1.

However, the Kerberos change-password protocol has some shortcomings, notably:

First, it needs four messages to be exchanged between the application server with the password/key registry) and the requesting workstation. This requires time and gives a potential intruder four possibilities to attack the information exchange. It is generally desirable to reduce the number of messages.

Second, within the lifetime of a special change-password ticket, which is by default a minute in the Keri-eros system, a so-called Trojan Horse program could create an additional message changing the password to a third value unknown to the user but known to an intruder controlling the Trojan Horse. (In the Kerberos system, a "ticket" is an encrypted message containing a secret key to be used to authenticate to a service.) Below, this is named the Trojan Horse attack.

A similar problem can occur if the user leaves his/her terminal unattended just after changing the password/key. Then, an intruder can walk by and assemble a valid change-password ticket with a program residing somewhere else in the system. In order to access the locally cached key needed to assemble this ticket, this program must be running on the victim user's behalf. Many programs in UNIX have this feature, due to their set-up permission rights: when started from a user's shell, they obtain this user's rights. This shall be named a walk-by attack.

Third, the Kerberos function is not generalized to be used also for the renewal of "strong" keys between the authentication server and application servers.

Fourth, perhaps one of the main issues is that in case of a loss of one of the (four) change-password messages, no algorithm is given which would allow for automatic recovery without resorting to off-line means.

Some of these shortcomings of the Kerberos system were addressed by Bellovin and Merrit in [2].

SUMMARY OF THE INVENTION

The present invention overcomes the above shortcomings of the known systems by providing a secure and compact authentication protocol between a user and the authentication server without sacrificing any of the important advantages of the known systems. According to the invention, just two messages need to be exchanged and a simple, straightforward error recovery is provided. The protocol is secure against Trojan Horse and walk-by attacks and can be used to change passwords and cryptographic keys.

In brief, the invention as claimed is a method for providing exchange of a new password or key in a communication network with one or more users and at least one authentication server, wherein the user First requests a key change by transmitting a specific message to the server. This first message has at least information on freshness, the user's name or identifier, a ticket encrypting the selected new key under the present key, and a ticket encrypting the present key under the new key. The server then identifies the user, determines the new key by employing the stored present key of said user, determines a potential present key and compares the latter with the actual present key, and, depending on the result of said comparison and some further conditions, (i.e. when said new key does not comply with given key selection rules, or when other transmitted information, e.g. the freshness information is out of a given range) either rejects or accepts the new key. The server then acknowledges by replying to said user with a specific second message. This second message contains at least an accept/reject message, and an encryption of the received change key request under the present key.

If the user does not receive an acknowledgement from the server in due time, an error is specified. Errors are recovered by simply resending the first message from the user, of course with newly adapted freshness information, and performing the same method steps again.

The advantages of the key change method according to the invention will become apparent from the following description of an embodiment; they can be summarized as follows:

The protocol is based on a single and atomic challenge/response exchange. The possibility of idempotent re-tries provides for a level of robustness and security that is not possible with current protocols.

The protocol messages are not re-playable in the sense that a replay cannot have harmful effects, i.e. would be received unnoticed. This feature is due to the asymmetric property of the tickets in the password change request.

The protocol offers protection against walk-by-attacks and Trojan Horse programs.

Partial protection against replay of re-used keys is provided by using a timestamp as one of the two nonces in the ticket construction.

The protocol can be resumed after a system crash either on the side of the authentication server or the requesting principal.

Figure 1:
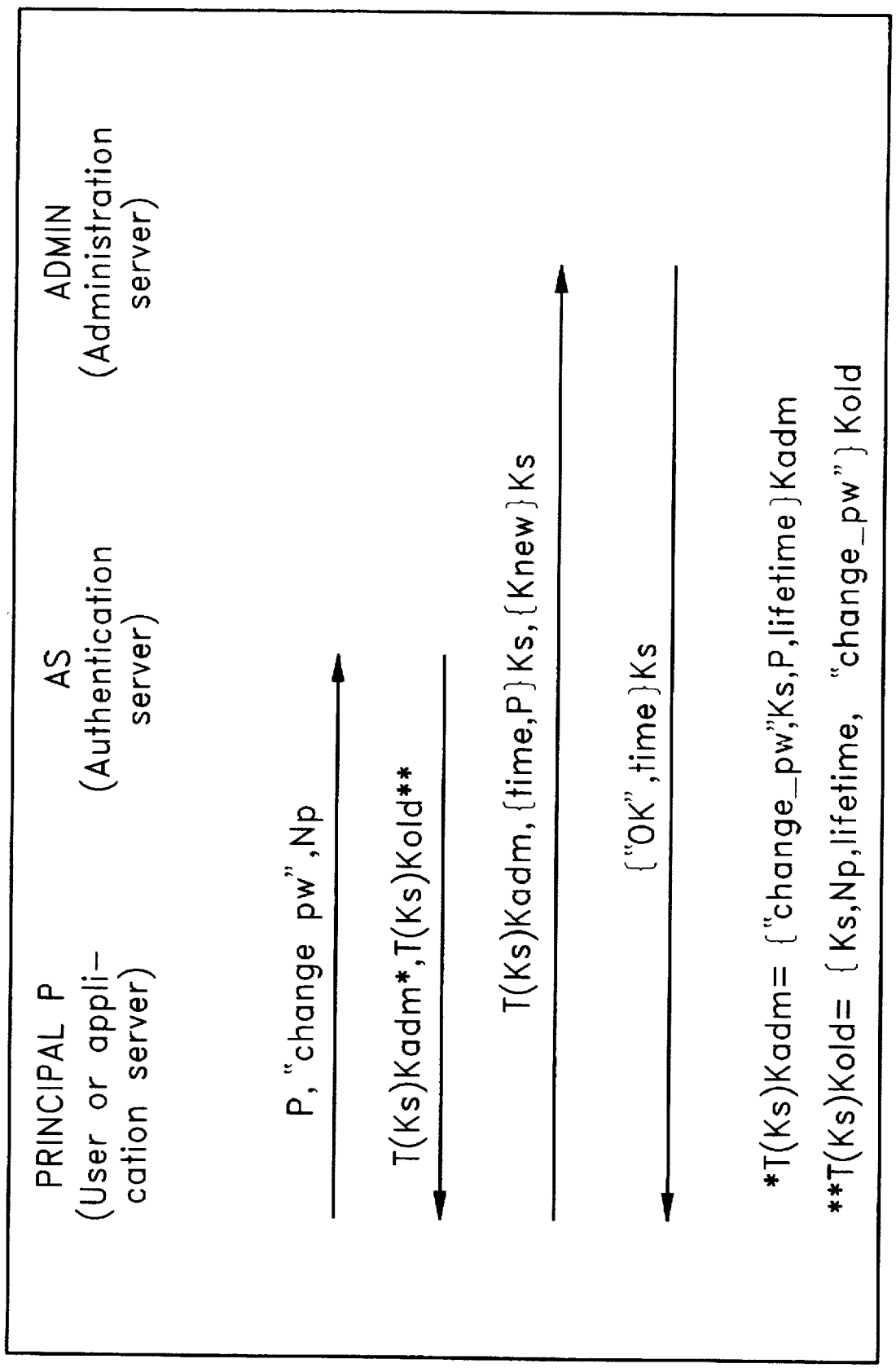
FIG. 1 shows a flow chart of the prior art Kerberos protocol for changing keys or passwords between a user (or application server) and the authentication server.

The following notations are used hereinafter and in the drawings:

Legend and Notation
T(X)Y ticket containing X sealed with Y
{Y}X message Y encrypted under key X
X+Y X exclusive-OR (XOR) with Y
AS authentication server's name
ADMIN administration server (separate process co-located with the AS)
Np nonce issued by principal
N1, N2 nonces
Ks session key (between principal and ADMIN)
Kadm shared key between AS and ADMIN
Kold old key or password shared between principal and AS
Knew new key or password to be shared between principal and AS
P principal's name
PDB principal data base at authentication server AS

DESCRIPTION OF THE PREFERRED EMBODIMENT

For the sake of clarity and simplicity, the term "key" is used hereafter in reference to both password and keys.

The present change-password ((CPW) protocol is used to change the user's password or an application server's master-key, as stored in the registry or principal data base (PDB) at the authentication server.

The invention addresses the following requirements:

The CPW request should contain an authentication of the sender. In case of the sender being a human user at a poorly protected workstation, this involves providing the old password or key again to prevent password changes from unattended workstations on which a user is logged on, but presently absent.

The CPW request must be self-checking, i.e. the AS must be able to find out whether the new key (Knew) it extracted is the right one, in other words, that the message was not corrupted.

The AS has to confirm the state of the password change (success or failure) to the principal. The acknowledgement itself must be authenticated and can be issued repeatedly for the re-transmissions of the CPW request message.

Even if CPW request message is replayed, no information useful to an intruder should be gained which can be deployed for harmful attacks. Even assuming that the user makes the error of repeating passwords, which he or she used in former periods, replays are prevented in almost every case.

The following assumptions are made:

The principal does not change the value of the new key (Knew) until successful validation of the CPW request. Knew is also not installed if a negative acknowledgement, rejecting Knew, is sent. A reason can be that the new key is poorly chosen, e.g. the user's full name.

If a CPW cannot be completed successfully, the user is assumed to be capable of remembering the new and the old key until his next login attempt, i.e. the resumption of the CPW protocol.

Usually, the AS is "single-state" with respect to a given principal. In other words, it may but need not remember more than one key per principal (i.e. it does not have to keep any key history).

Further, the AS has a fairly accurate clock. Fairly accurate means that it is accurate with respect to the frequency of CPWs which happen infrequently, i.e., daily, weekly or monthly, but not every minute or hour.

Each host or workstation (where CPW requests originate) also possesses a fairly accurate clock. However, that clock need not be tightly synchronized with the AS clock.

The requesting machine's file system allows any process with the user's identification to read a cached single-sign-on key, Ksso. Such a key is a strong session key established between the user's processes and the AS during initial login. It is used to access other services without having to provide a password every time.

Variables in the main memory (containing Kold and Knew) are only readable by the process which allocates them.

The Protocol according to the invention is described in the following.

The basic idea of the invention is to construct an idempotent "flip-nop" request. After a first CPW request without successful receipt of an acknowledgement, the principal must simply retransmit his request. The authentication server, AS, knows in this case either the present key, Kold, or the new key, Knew, depending on whether the CPW request or the acknowledgement got lost, but the flip-flop property of the request enables it to process the request message correctly in either state:

As soon as the AS receives an authentic CPW request, it processes it and replies with an acknowledgement. If the AS receives an authentic request again from the same sender, obviously the acknowledgemnent must have been lost, thus the principal data base, PDB, in the AS is left untouched and another acknowledgement is issued.

The result of this simple protocol is that there may he a temporary uncertainty on the side of the principal as to the state of the AS, but this requires no action by the principal beyond retransmitting the request. As soon as the communication is working again, the first acknowledgement re-synchronizes, so-to-speak, the two sides.

Figure 2:
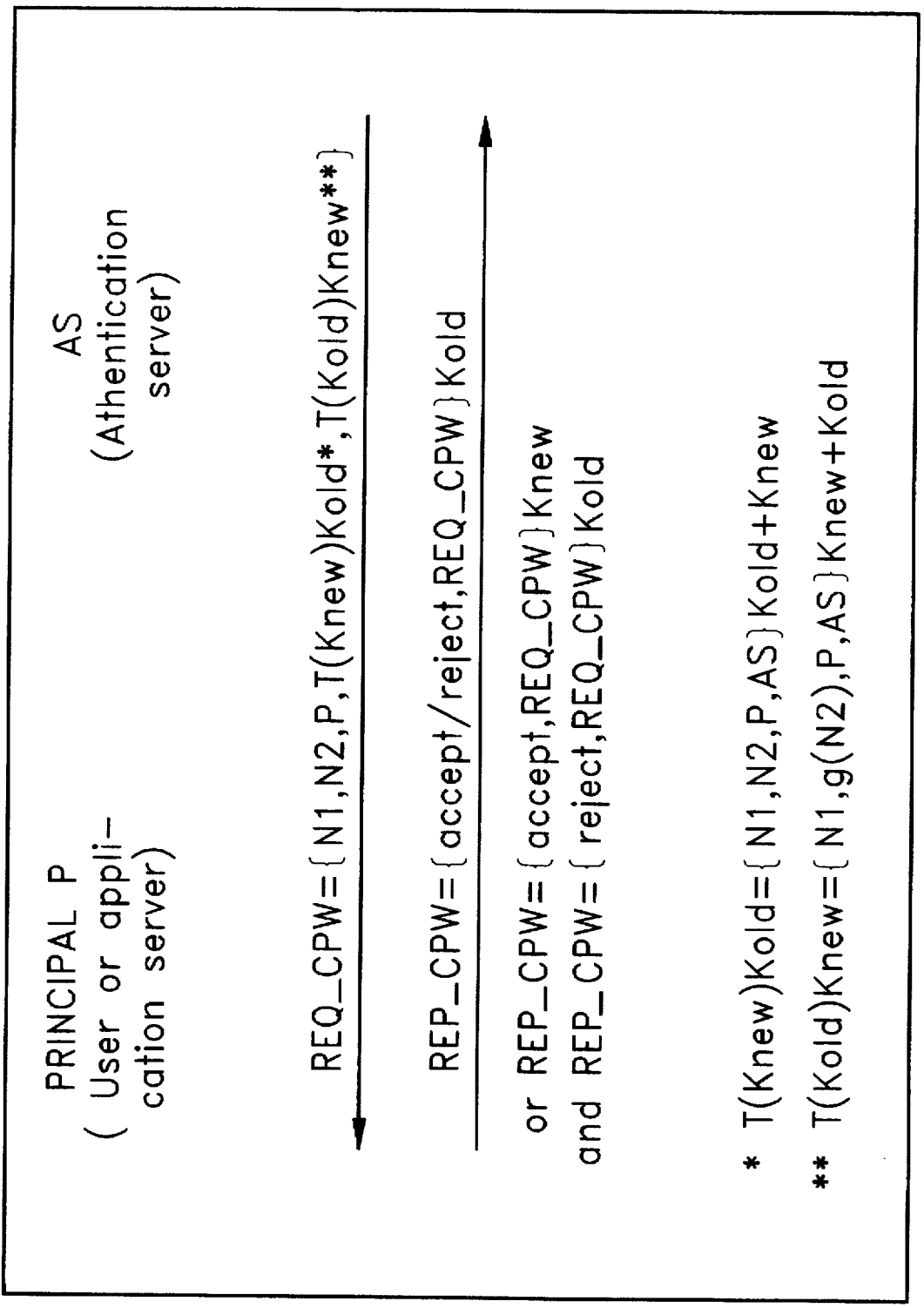
FIG. 2 is a logical flow chart of the key change protocol according to the invention.

FIG. 2 shows the protocol according to the invention in a flow chart fashion. Terms and notation used are explained above, except for the function "g" which is addressed in the following.

The function "g" provides for asymmetry between the two tickets in such a way that an intruder cannot swap the two tickets and thereby convince a server to switch back to the old key. First, "g" must be asymmetric, otherwise manipulation of the plaintext N2 (e.g. reciprocal value or XOR with N1) would re-enable the above swapping attack. Second, the function "g" could depend on the single-sign-on key, Ksso. This requires that a user is prohibited from logoff until the CPW protocol is completed, because a logoff clears Ksso.

As an example, the principal may have already obtained a strong key Ksso during the initial login and, when a CPW is requested, the function "g" is made dependent on Ksso, e.g. g={N2}Ksso. This would make the protocol resistant to dictionary attacks, since an intruder would have to break Ksso before attacking Kold and/or Knew.

On the other hand, assuming that the intruder did not record the initial single-sign-on ticket which contains Ksso encrypted with a derivation of the present or old key, Kold, this approach has the advantage that the CPW request, REQ_CPW, is not verifiable plaintext. (Otherwise, the self-checking feature makes REQ_CPW verifiable.

With the above requirement in mind, one possibility is g=(N2+1). Another one is g={N1}Knew. None of them would, however, resist dictionary attacks.

The first nonce, N1, is preferably set to the current time. The second nonce, N2, is chosen at random. The setting of N1 does not require synchronized clocks because the skews of the workstation clocks are generally much smaller than the frequency of key changes. If an intruder should set a workstation's clock to some random time in the future, the authentication server, AS, would still reject this challenge because of wrong time. The intruder could replay it at that time with the assumption that the principal by then just re-used the very same old key, Kold, however, this is considered highly improbable. (It is later referred to as "partial pw-cycle prevention".) With this choice of the nonces, two items provide for synchronization: Kold and the "timestamp" N1.

The AS, receiving REQ_CPW, reads the first ticket, using Kold (the principal's key in the database), extracting Knew. Then AS reads the second ticket, using Knew, extracting K' old. If Kold=K' old, the AS is assured that it still has the principal's old key. It then stores Knew in the pricipal data base, PDB, and sends back a positive acknowledgement, i.e. REP_CPW, described below.

If Kold differs from K' old, the message could still be a re-try from a principal that did not receive the REP_CPW message for a successful key-change. In that case, Kold, the principal's current key stored in the database, would actually equal Knew, the new masterkey chosen by the principal which is supposed to be transmitted with REQ_CPW.

The AS can check this by reading the second ticket with its current Kold (Kold=the ticket's Knew), extracting K" old (the former Kold), and reading the first ticket with K" old, extracting K' new. If K' new=Kold, the AS knows it already had the new masterkey stored in the database and only sends the REP_CPW to the principal.

The acknowledgement has the following form:

REP_CPW={accept/reject, REQ_CPW} Kold

This acknowledgement securely ties the accept/reject reply to the proper request.

Return codes for the following cases must be provided:
N1 is incorrect time
Knew is unacceptable
key successfully changed (either the first time or already with the previous REQ_CPW)

An incorrect or malformed REQ_CPW is one where:
Kold/Knew do not satisfy the "flip-flop" structure described above, or
the timestamp represented by N1 is unacceptable, i.e., outside the limits of the acceptable clock skew.

The AS replies with "reject" only if Knew is not acceptable for some reason (e.g3. an easily guessable password). However, Knew must still satisfy the "flip-flop" property of the REQ_CPW. In other words, AS replies (be it with "accept" or "reject") only if REQ_CPW is genuine.

REQ_CPWs which do not satisfy the "flip-flop" property are not acknowledged in the same manner. Any kind of authenticated acknowledgment in response to such an REQ_CPW is out of question, because doing so would require using the principal's current stored key. This would present an opportunity for a known plaintext or dictionary attack, cf. reference ff12". Therefore, the mechanism on the user's side must at least provide for an error message which, after a certain number of unanswered REQ_CPWs, i.e. a CPW request timeout, checks for the general availability of the AS and suggests resorting to off-line means for re-synchronization.

The acknowledgment message, REP_CPW, must also be protected. If not, an intruder could trap the original REQ_CPW, prevent it from reaching the AS and convince the principal that the change has taken place. The key used to protect REP_CPW can be any of Knew, Kold or Ksso. A problem with using Knew is, when the AS rejects Knew for some reason (e.g. weak key), the reply must still be authentic. In this case, Kold must be used. Alternatively, for the sake of uniformity, Kold can be used in both cases (i.e. success or failure).

Some remarks on the security of the proposed protocol follow. In addition to the possible attacks already addressed in the protocol description above, the following venues of attacking the protocol must be considered:

1. If the intruder eavesdrops on a REQ_CPW, the self checking "flip-flop" feature allows for an off-line key-search attack. This attack is possible because the very same structure of REQ_CPW that allows the AS to verify Knew and Kold allows the intruder to verify his guesses by iterating through the key space.

If the asymmetry function "g" involves Ksso, the intruder must additionally eavesdrop on the initial SS0 ticket employing Kold. Thus, this attack is not relevant as the intruder could verify its password guesses on subsequent challenges directly without needing REQ_CPW at all. If "g" does not depend on Ksso, the threat is still real. However, the initial login (SS0) protocol is still the weakest point because:

its equal degree of vulnerability-unassisted login (without smartcards or similar devices) is at least as vulnerable as the present protocol, its higher frequency-users login much more often than they change passwords thus affording much greater opportunity for intruders.

The same risks affect the original Kerberos protocol since these risks are intrinsic to all password-based log-in protocols.

2. Since the AS is only single-state (i.e. it need not remember more than one key per principal), only one of the two keys in REQ_CPW must be correct in order to run the protocol. Therefore, if the intruder guesses Knew correctly, Kold becomes an open variable.

Nonetheless, one must note that it is as hard to guess a correct Knew as it is to discover both Knew and Kold. The reason is that, by taking advantage of the "flip-flop" property, the intruder can discover both Knew and Kold by iterating on just one of them. Therefore, assuming that the magnitude of the entire key space is M, at most M trials are necessary for the intruder to break the protocol. However, the probability of guessing a correct Knew (or Kold) is (1/M), which implies that on the order of M trials would be necessary to guess the correct key.

Figure 3:
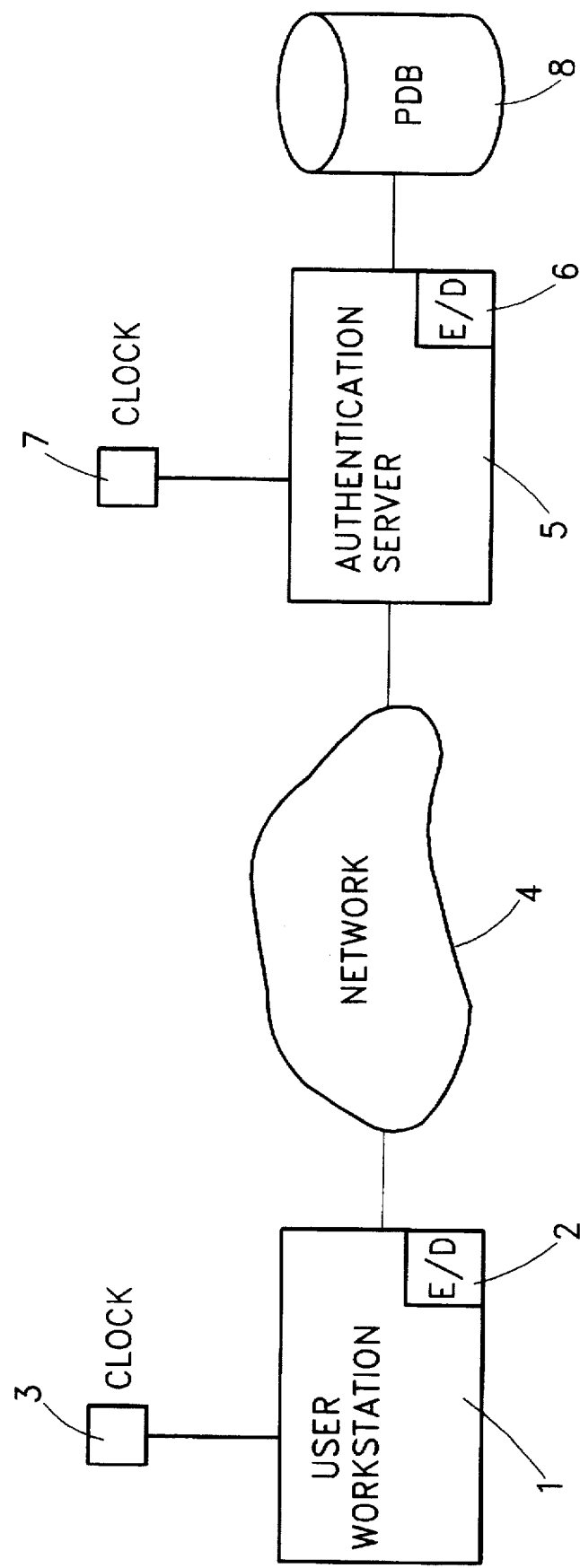
FIG. 3 depicts a basic layout of a communication network in which the invention can be used.

FIG. 3 shows a communication network, sketchy, but in sufficient detail to explain an embodiment of the invention in hardware terms. The system provides the desired secure communication between users or between a user and an application server. The drawing shows the basic layout of a system with a user workstation 1 having encryption/description means (E/D) 2 and a clock 3. Workstation 1 is connected to a network 4 of arbitrary form and layout. Further linked to this network 4 is an authentication server 5 which also includes encryption/descriptions means (E/D) 6 and a clock 7. Authentication server 5 includes and/or has access to a principal data base (PDB) 8.

The system of FIG. 3 functions as follows. Initially, principal data base 8 has the old user key (Kold) stored. A (human) user accesses workstation 1, desiring to change of his/her password or key. An example would be a bank client at an automatic teller machine, desiring to change his/her personal identification number, usually termed PIN, for his/her credit/bank card. The user enters, preferably guided by specific questions from the automatic teller, his/her old key (Kold) as identity information and the desired new key (Knew). Workstation 1, i.e. the automatic teller machine, encrypts by its E/D means 2 the entered identity information, i.e. the old key (Kold), the new key (Knew) and so-called freshness information, i.e. the present time as recorded by work station clock 3, in accordance with the above described method. The encrypted message, including an appropriate key change command, is sent over network 4 to authentication server 5.

Within server 5, the received message is interpreted whereby E/D means 6 decrypts the information contained in the message. The transmitted (and decrypted) freshness information, i.e. the workstation clock time, is compared with the time that server clock 7 shows and it is determined whether the (usually existing) time difference is within prescribed limits. The transmitted (and decrypted) identity information, i.e. the old key (Kold), is compared with the stored key contained in principal data base 8. The desired new key (Knew) is investigated whether it is acceptable or not, i.e. whether it satisfies prescribed requirements.

When server 5 determines that
1. the time difference is acceptable and
2. the transmitted old key equals the stored old key and
3. the new key is acceptable, it accepts the key change and acknowledges it by replying to workstation 1 with an appropriate accept indication and an encryption (by E/D) 6 of the received key change request. The new key (Knew) is stored in principal data base 8. If one or more of the above conditions is/are not satisfied, server 5 replies to workstation 1 with a message indicating rejection of the key change request.

It should be understood that the above is a description of a preferred embodiment that enables a person skilled in the art to implement the invention. The description does not contain all background explanations nor does it give the theoretical foundation for the invention. Such can be found in the (cited and other) prior art relating to the field.

References

[1] J. G. Steiner, B. C. Neuman, J. I. Schiller: "Kerberos: An Authentication Service for Open Network Systems", Usenix Conference Proceedings, Dallas, Tex., pp. 191–202 (February 1988).

[2] S. M. Bellovin, M. Merrit: "Limitations of the Kerberos Authentication System", Computer Communication Review, vol. 20(5), pp. 119–132 (October 1990).

Having thus described our invention, what we claim as new and desire to secure by Letters Patents is:

1. A method for providing exchange of a new key (Kwew) in a communication network with at least one user and at least one server for authentication between a user (P) and a server (AS), comprising the following steps:

a. the user requests a key change (REQ_CPW) by transmitting at least the following information to the server (AS):

two nonces (N1, N2), at least one of which contains freshness information, the user's identifier (P), an encryption (E{Knew}Kold) of a selected new key (Knew) under a present key (Kold), and an encryption (E{Kold}Knew) of the present key (Kold) under the new key (Knew), b. the server identifies the user, determines a potential new key (Knew") from the received encryption (E{Knew}Kold) of the new key under the present key by employing the stored present key (Kold) of said user, determines a potential present key (Kold") from the received encryption (E{Kold}Knew) of the present key under the new key, compares the determined potential present key (Kold") with the stored present key (Kold), and c1. rejects the potential new key (Knew"), when any one of the following conditions occurs:
said comparison shows inequality,
said potential new key does not comply with all predetermined key selection rules, and
one of the nonces (N1, N2) has a value that is outside of a respective predetermined range thereof, or c2. accepts the new key when said comparison shows equality and the potential new key (Knew") is correctly chosen and the nonces (N1, N2) each have a value that is inside of the respective predetermined ranges thereof, and d. acknowledges by replying (REP_CPW) to said user with at least the following information:
an accept/reject indication whether the potential new key (Knew") is accepted by the server (AS) or not, and an encryption of the received change key request (REQ_CPW), and e. the user determines from the received reply message (REP_CPW) whether the selected new key (Knew) is accepted, and authenticates this determination by decrypting the returned change key request (REQ_CPW).

2. The key exchange method of claim 1, wherein the encryption (T{Knew}Kold) in the user's key change request is an encryption of the nonces (N1, N2), the user name (P), and the server name (AS) under the present key (Kold), X-ORed with the selected new key (Knew), T{Knew}Kold={N1, N2, P, AS}Kold+Knew, and
the encryption (T{Kold}Knew) is an encryption of the nonces (N1,g) at least one nonce being modified under a preselected asymmetric function (g), the user name (P), and the server name (AS) under the new key (Knew), X-ORed with the present key (Kold), T{Kold}Knew={N1, g(N2), P, AS} Knew+Kold.

3. The key exchange method of claim 1, wherein the reply message (REP_CPW) of the authentication server contains an encryption (E{REQ_CPW}Kold) of the received change key request (REQ_CPW) under the stored present key (Kold).

4. The key exchange method of claim 3, wherein the reply message (REP_CPW) of the authentication server further contains an encryption of the accept/reject indication under the stored present key (Kold).

5. The key exchange method of claim 1, wherein the reply message (REP_CPW) of the authentication server is in case of an accepted new key (Knew), an encryption of the accept indication and the original request (REQ_CPW) under the new key (Knew) and in case of a rejected new key (Knew), an encryption of the reject indication and the original request (REQ_CPW) under the stored present key (Kold).

6. The key exchange method of claim 2, wherein the preselected function (g), modifying one of the nonces (N2), is an encryption of the other nonce (N1) under the new key (Knew).

7. A system for providing exchange of a new key in accordance with the key exchange method of any one of claims 1 to 6 to enable secure communications between users of a communication network, said apparatus comprising:

a. at least one authentication server;

b. means in said server for storing an initial unique user key (Kold) for each said user;

c. means in the user desiring a key change, for encrypting and transmitting identity and freshness information from said user as a key change request to said server;

d. means for decrypting and interpreting the received key change request at said server;

e. means in said server for determining acceptance or non-acceptance of said key change request;

f. means in said server for encrypting and transmitting a reply to said user, indicating acceptance or non-acceptance; and g. means in said user for receiving and interpreting a reply received from said server.

8. A method according to any one of claims 1 through 6 implemented in a communication system having a first plurality of users and a second plurality of servers, at least one of the servers being an authentication server, for changing passwords exclusively between users and said authentication server.

* * * * *